Jan. 20, 1942.   G. E. DUNN   2,270,279
UNIVERSAL JOINT
Filed Aug. 17, 1940   2 Sheets-Sheet 2
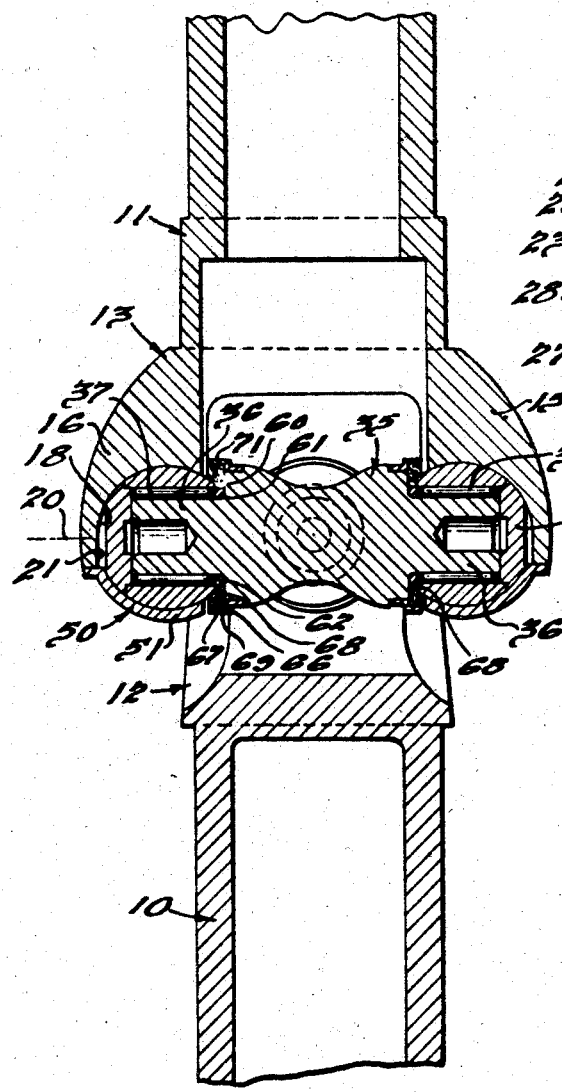
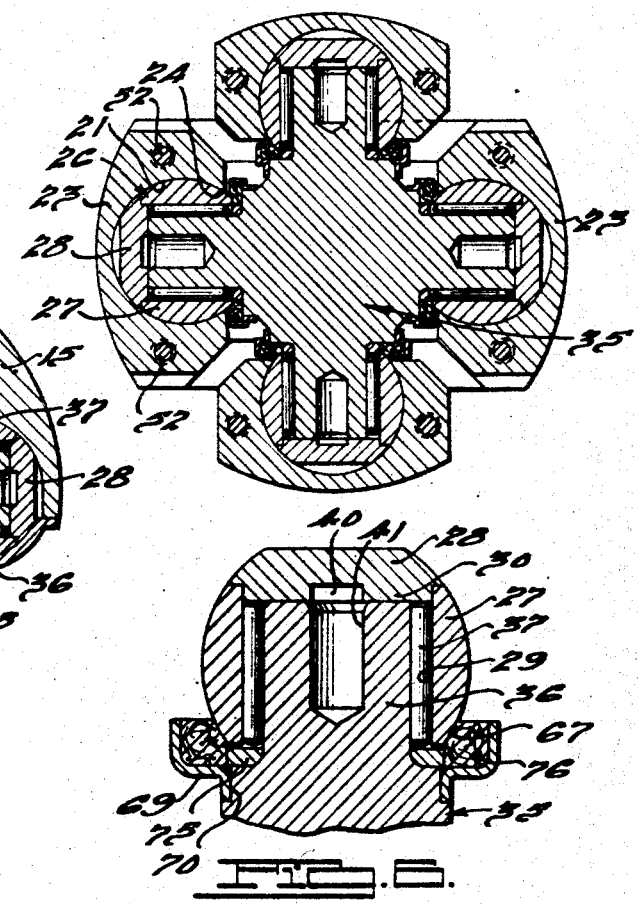
INVENTOR
George E. Dunn.
BY Harness, Dickey & Pierce
ATTORNEYS.

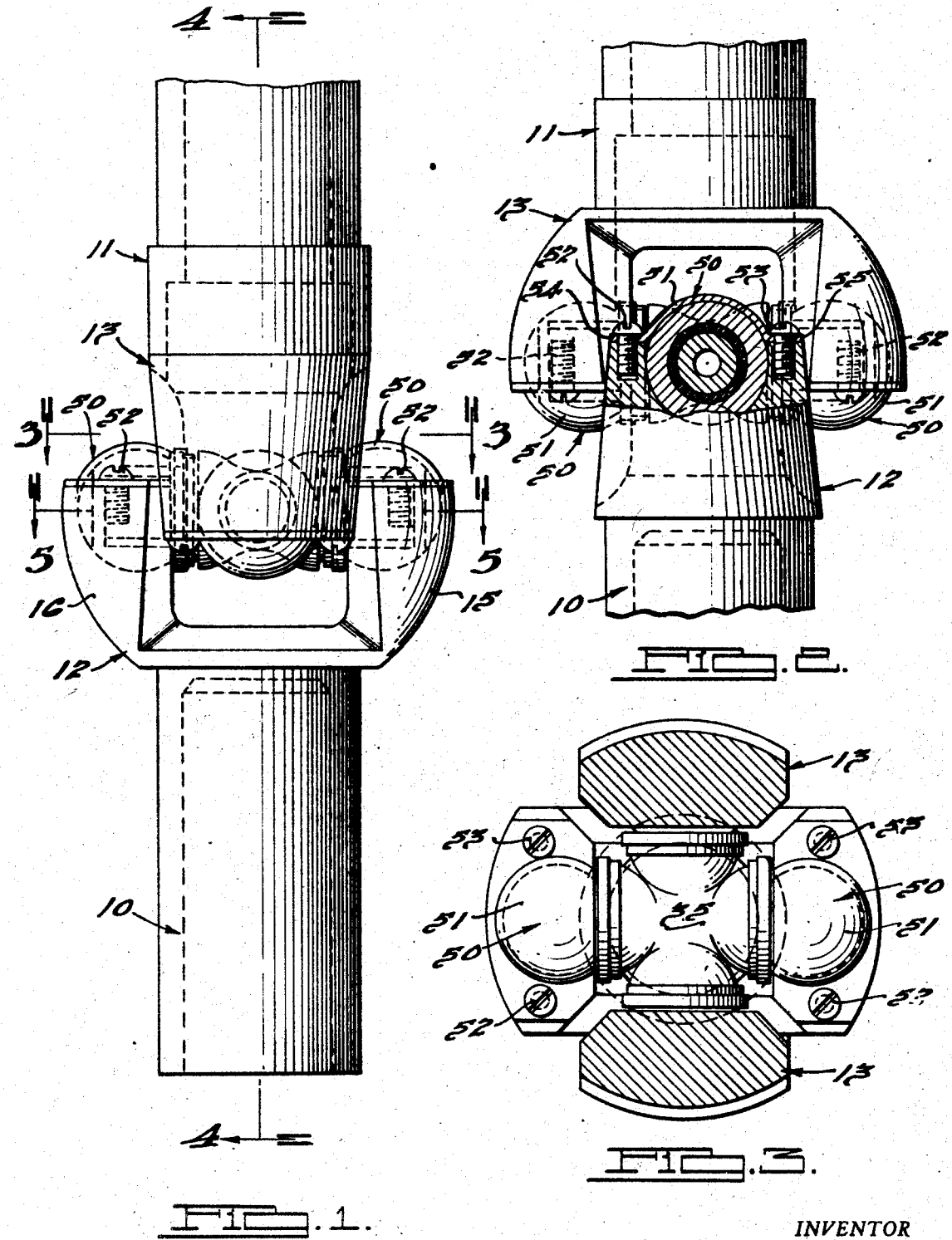

Patented Jan. 20, 1942

2,270,279

UNITED STATES PATENT OFFICE 2,270,279

UNIVERSAL JOINT

George E. Dunn, Dearborn, Mich., assignor to Universal Products Company, Incorporated, Dearborn, Mich., a corporation of Delaware Application August 17, 1940, Serial No. 353,016

5 Claims. (Cl. 64—17)

The invention relates generally to motor vehicles and it has particular relation to improvements in universal joints.

In certain respects the invention constitutes a continuation of that embodied in my copending application for patent, Serial No. 238,156, filed November 1, 1938.

In the mentioned copending application for patent, a universal joint is disclosed which includes a cross having trunnions and ball members turnable on the trunnions and a pair of yoke members having sockets for receiving the ball members. In a joint of this character, the ball members can align themselves with respect to the trunnions and roller bearings provided within the balls and around the trunnions. Self alignment of the ball members enables obtaining full roller bearing contact regardless of torque conditions and thus avoids localized roller bearings engagement caused by bending, even though slight, of the trunnions. Full roller bearing contact enables reducing the size of the joint since one factor governing the size of the joint is the capacity of the roller bearings to transmit torque load and if they are subjected to localized bearing engagement, a larger roller bearing unit is required.

While alignment of the trunnions, rollers, and ball members is desirable, it is also desirable to have a strong yoke structure which will retain the ball members in place, which will allow assembly rapidly and without difficulty, and which is not expensive to manufacture. Moreover, it is desirable to have a yoke structure which does not undesirably enlarge the joint or increase its weight. In general, a structure such as briefly described above is embodied in the copending application for patent mentioned and the present invention is concerned with improvements, which still further enable reducing the size, weight, and cost of the joint, without sacrificing durability and efficiency.

One object of the invention, therefore, is to provide an improved universal joint of the general type mentioned, which enables reducing the size and the weight of the joint, and the cost of manufacturing and assembling the parts thereof.

Another object of the invention is to provide an improved joint of the type mentioned which has an improved ball member of such character that the overall size of the joint actually can be reduced and manufacturing operations employed in making the ball members can be simplified.

Another object of the invention is to provide an improved sealing means for sealing the space or gap at the inner end of the ball members in order to prevent lubricant from escaping from the bearings and to prevent dirt or other foreign matter from gaining access to the bearings.

Other objects of the invention will become apparent from the following specification, from the drawings relating thereto, and from the claims hereinafter set forth.

For a better understanding of the invention reference may be had to the drawings, wherein:

Figure 1 is an elevational view of a universal joint as constructed according to one form of the invention;

Fig. 2 is a view similar to Fig. 1 but partly in cross-section so as to illustrate the relation of ball, yoke, trunnion, and rollers as seen in transverse section;

Fig. 3 is a cross-sectional view taken substantially along the line 3—3 of Fig. 1;

Fig. 4 is a cross-sectional view taken substantially along the line 4—4 of Fig. 1;

Fig. 5 is a cross-sectional view taken substantially along the line 5—5 of Fig. 1;

Figs. 6 and 7 are detail views in cross-section illustrating other means for sealing the space between the end of the ball members and the trunnions.

Referring to Figs. 1 and 2, the universal joint illustrated includes a pair of hub members 10 and 11 terminating in yokes 12 and 13, respectively. The hubs 10 and 11 are adapted to be connected to a driving and driven shaft, respectively, and, as an example, the hub 10 may be connected to the transmission driving shaft and the hub 11 may be connected to a shaft extending to the rear axle of the vehicle. Each of the yokes 12 and 13 has diametrically opposed arms 15 and 16 and the arms of one yoke are disposed between and in 90° spaced relation to the arms of the other yoke.

Now directing attention to Figs. 4 and 5 in particular, each of the arms 15 and 16 has a ball seating socket or recess 18, which is of spherical contour substantially to the radial center plane of the joint indicated at 20 in Fig. 4. Beyond this plane, and between it and the free end of each arm, the socket is cylindrical in character as indicated at 21, from which it follows that the first part of the socket is cylindrical and then inwardly thereof the socket is of spherical character, it being understood that the radii of both parts of the socket are the same. It may be noted here that the spherical part 18 is of semi-spherical character and that the center of the spherical surface lies in the plane 20.

Directing attention particularly to Fig. 5, it will be observed that the socket is outwardly closed by a bridging portion 23 of the yoke arm and that the socket opens at its inner side, as indicated at 24, to the central space between the yoke arms. The opening 24 is not as wide as the diameter of the socket so that a ball will be retained against inward movement.

Each of the sockets in the yoke arms receives a ball member 26, which comprises two frusto-spherical parts 27 and 28, best shown by Fig. 6. The spherical part 27 has a diametrical bore 29 extending entirely therethrough while the spherical part 28 has a portion 30 projecting slightly into the outer end of the bore 29 and fitting closely therein. The parts 27 and 28 may be held together by having the portion 30 press fitted in the bore 29 sufficiently tight to seal the bore against leakage of lubricant. When so press fitted together, there is no danger of separation of such parts after assembly of the joint because the pressure of the cap 50 and socket 18 tends to hold the parts together and during operation of the joint, vibration or other causes cannot separate them. Under certain conditions it might be found desirable to fasten the parts 28 and 27 together by brazing or the like.

A cross 35 having four trunnions, each indicated at 36, interconnects the two yokes and the trunnions, respectively, project into the bores 29 of the ball members. Roller bearings 37 are disposed around each trunnion 36 and between it and the surface of the bore 29 and these rollers are substantially as long as the distance between the open inner end of the ball member and the inner base surface of the projecting part 30 of the frusto-spherical member 28. Recesses 40 and 41 provided in the frusto-spherical member 28 and the trunnions provide a reservoir for lubricant and lubricant is distributed throughout the bearing and particularly between the rollers. The member 28 serves as a thrust bearing member for engaging and centering the trunnion and cross and it will be observed that the outer parts of both members 28 and 27 contact with the outer spherical parts of the socket 18 and thus outward movement of the ball members axially of the trunnions is prevented.

Each ball member is retained within its socket 18 by a cap 50 having a spherical portion 51 engaging the ball member. Screws or bolts 52 and 53 extending through flanges 54 and 55 on the side edges of the cap and threaded into the arm at opposite sides of the ball-receiving socket, serve to secure the cap to the arm.

Each of the trunnions has a shoulder or base portion 60 joining the trunnion surface proper by means of a rounded corner 61 and between the ends of the rollers 37 and such shoulder a relatively hard metal wear ring 62 is located. This wear ring prevents the rollers from moving inwardly and engaging the rounded corner 61 and thus allows rounding of the corner to obtain strength of cross while still preventing engagement of the ends of the rollers with the rounded corner. This engagement, if not prevented, would probably cause the rollers to bend, flex, and skew. Furthermore, the wear ring 62 prevents the rollers from digging into the metal of the cross.

The space between the inner ends of the ball members and the base of the trunnion is sealed by means of a packing ring 66 which engages a part of the spherical surface on the ball member as indicated at 67 and also the end edge face of the ball member as indicated at 68. The sealing ring is retained in position by means of a ferrule 69 press fitted on a portion 70 of the trunnion and this ferrule has a wall 71 which overlaps the spherical surface of the ball member. Sealing is effected by engagement of the sealing ring with the shoulder or base portion of the trunnion and the spherical and edge faces of the ball member and entry of dirt or the like is also prevented by the action of centrifugal force which opposes the movement of foreign matter into the space between the wall 71 and the ball when the joint is rotating.

Now directing attention to Fig. 6, a modified form of wear ring and sealing arrangement is provided. In this case the wear ring indicated at 75 extends laterally under the inner end of the ball member, while the sealing ring indicated at 76 contacts only the spherical surface of the ball member.

In the construction shown by Fig. 7, a conically formed sealing ring 77 is provided which engages only the spherical surface of the ball member, while the ferrule has a conical wall 78 retaining the sealing ring. The sealing ring in all cases may be composed of felt, cork, or other suitable material.

In connection with the type of joint disclosed, it has been intimated previously that the size of the joint may be reduced and that various factors govern reduction in overall diameter of the joint. In the first place, by using self aligning ball members, the balls may turn in such manner that the bores thereof will be aligned perfectly with the cross and rollers under varying torque conditions. During torque application any trunnion will bend or flex and, although this is not noticeable to the eye, any slight flexing or bending of the trunnion will tend to cause the torque load to be localized on the outer ends of the rollers at one circumferential side of the trunnion, and the inner ends of the rollers at the opposite circumferential side. It may be added also that a slight clearance or bearing tolerance is normally present around the rollers and that initial torque application will cause the trunnion to turn circumferentially of the joint axis a slight amount relative to the ball and this slight relative movement will initially localize load application at the outer ends of the rollers. In the present case, however, the ball can turn in a manner which will permit its bore to stay aligned with the trunnion and roller so that the rollers will have full bearing engagement with the trunnion and bore surfaces at all times regardless of the torque load. This being true, smaller rollers may be used for the simple reason that joints without the alignment feature have to employ larger rollers in order to take care of the localized pressure condition mentioned during bending or flexing of the trunnions. It follows then in the present case, that the rollers and trunnions may be made shorter, the balls may be disposed closer to the axis of the joint, the yoke arms may be disposed closer to the axis of the joint and, therefore, that the overall diameter of the joint may be smaller, the parts individually smaller in dimensions, and that the weight and size may be reduced.

Additive to the foregoing, rollers of smaller diameter may be used, the diameter of the trunnions may be increased, and thus a stronger trunnion actually smaller in overall diameter, may be used. Again, by eliminating or substantially eliminating packing between the base of the trunnion and rollers or ball member, and employing a wear ring at this location, a stronger trunnion and cross junction may be obtained while still preventing damage to the rollers. Moreover, this construction and arrangement permits to some extent reduction in trunnion length and overall diameter of cross and joint.

It has been stated heretofore that the socket portion 18 is semi-spherical and extends to the radial plane of the trunnion axis and that outwardly of this trunnion axis plane, the socket portion 21 is cylindrical. When torque loads are applied through the trunnions and ball members, each ball member naturally tends to leave its seat and reach localized contact with the socket in the radial plane of the trunnion axes. If the cylindrical portions 21 of the sockets were not present, the localized contact immediately would facilitate working of the ball members out of the sockets since the balls would fulcrum on the edges of the semi-spherical portions and the metal would give and deform and shortly the balls would be exerting more and more pressure against the caps until failure occurred. By having the cylindrical portion 21, the ball, upon leaving the seat 18 a slight amount forms a surface contact with the cylindrical portion 21 along the radial plane of the trunnion axis and symmetrical thereto and thus a fulcrum for promoting forces against the cap is avoided. Any tendency of the balls to work farther out of the recesses is thus prevented and the caps are not subjected to damaging forces or damaging deformation. It is to be observed, also, that the outer parts of the sockets hold the balls against outward movement along the trunnion axis and this is true in both the cylindrical and spherical parts of the sockets. It may be observed here that the spherical socket prevents outward movement of the ball along the trunnion axis while the ball is seated therein but if the ball moves slightly out of the socket towards the cap, the ball then is held against outward movement along the trunnion axis by the cylindrical part 21. Thus, the cylindrical portion is important in preventing movement of the ball towards the cap and outwardly along the trunnion axis.

The bridge 23 strengthens each arm and, in conjunction with the cap, forms an outwardly closed receptacle so that the only place where water or other foreign matter can get to the ball is through the sealing means and the latter prevents entry at this point. Thus, a closed ball receiving recess is provided.

Making the ball in two parts is advantageous since the bore 29 may be formed in part 27 and without interference before the part 28 is added and it is unnecessary to have a relief groove such as would be necessary if the bore were formed in a solid ball. With given ball size and wall thickness thereof, a longer roller contacting surface may thus be provided and actually the net result is that a smaller ball and smaller rollers may be employed while still obtaining desired bearing surface and contact. Thus, this structure is an additive factor promoting reduction in size of the joint.

With respect to the wear rings 62 and 75 and associated sealing means, this matter is disclosed and claimed in a separate application for patent, Serial No. 396,647, filed June 5, 1941. Also with respect to the two part ball structure, this matter is disclosed and claimed in a separate application for patent Serial No. 395,213, filed May 26, 1941.

Although more than one form of the invention has been described and illustrated in detail, it will be apparent to those skilled in the art that various modifications may be made without departing from the scope of the appended claims.

What is claimed is:

1. In a universal joint of the four trunnion type, including a pair of yokes each having a pair of arms, each arm having a recess of substantially cylindrical surface character extending from its free end and terminating inwardly in a bottom surface adapted to engage a ball, that face of the arm next to the joint axis having a slot which opens to the recess, a cross having trunnions respectively projecting through the slots and into the recesses, a ball member on each trunnion and seated in its respective recess and being of substantially the same diameter as the cylindrical surface part of the recess and having a diametrically extending opening receiving the trunnion, small cylindrical rollers in the ball opening and around the trunnion, means on the ball substantially engaging the trunnion for centering the cross relative to the joint axis, each recess embracing the ball outwardly beyond the recess axis to center the ball with respect to the joint axis and further being of such depth that a substantial cylindrical surface part thereof is located between the trunnion axis and the free end of the arm when the ball is seated against said bottom surface and which part is adapted to provide a torque driving ball seat and ball centering means, and a cap releasably fastened on the free end of the arm and contacting the ball.

2. In a universal joint of the four trunnion type including a pair of yokes each having a pair of arms, each arm having a recess of substantially cylindrical character extending from its free end and terminating inwardly in a bottom surface adapted to engage a ball, that face of the arm next to the joint axis having a slot which opens to the recess, a cross having trunnions respectively projecting through the slots and into the recesses, a ball member on each trunnion and seated in its respective recess and being of substantially the same diameter as the cylindrical surface part of the recess and having a diametrically extending opening receiving the trunnion, small cylindrical rollers in the ball opening and around the trunnion, means on the ball substantially engaging the trunnion for centering the cross relative to the joint axis, each recess embracing the ball outwardly beyond the recess axis to center the ball with respect to the joint axis and further being of such depth that a substantial cylindrical surface part thereof is located between the trunnion axis and the free end of the arm when the ball is seated against said bottom surface, and a cap releasably fastened on the free end of the arm and contacting the ball, each recess and cap forming a closed receptacle for the ball outwardly of the center of the latter.

3. In a universal joint of the four trunnion type, a trunnion bearing assembly comprising a member having a recess of substantially cylindrical surface character extending longitudinally of the joint axis and which is open at one end and which terminates in a bottom surface adapted to engage a ball, that side of the member next to the joint axis having a slot which opens to the recess, a trunnion projecting through the slot and into the recess, a ball member of substantially the same diameter as the recess and disposed therein in contact with said bottom surface and having an opening receiving the trunnion, small cylindrical rollers in the ball opening and around the trunnion, each recess being of such depth that a substantial cylindrical surface part thereof is located between the trunnion axis and the open end of the recess when the ball is seated against said bottom surface, and a second member releasably fastened on the first member over the open end of the recess and in contact with the ball.

4. In a universal joint of the four trunnion type, including a pair of yokes each having a pair of arms, each arm having a recess extending from its free end longitudinally of the joint axis and terminating in a bottom surface adapted to engage a ball, that face of the arm next to the joint axis having a slot which opens to the recess, a cross having trunnions respectively projecting through the slots and into the recesses, a ball member on each trunnion and disposed in its respective recess in contact with said bottom surface and being of substantially the same diameter as the width of the recess and having a diametrically extending opening receiving the trunnion, small cylindrical rollers in the ball opening and around the trunnion, means on the ball substantially engaging the trunnion for centering the cross relative to the joint axis, each recess embracing the ball outwardly of the joint axis to center the ball with respect to the joint axis and each recess being of such depth that a substantial part thereof is located between the trunnion axis and the free end of the arm when the ball is initially seated against said bottom surface and which part is adapted to provide a side torque driving ball seat, and a cap releasably fastened on the free end of the arm and contacting the ball.

5. In a universal joint of the four trunnion type, a trunnion bearing assembly comprising a member having a recess extending longitudinally of the joint axis and terminating at one end in a ball engaging surface adapted to engage a ball, that side of the member next to the joint axis having a slot which opens to the recess, a trunnion projecting through the slot and into the recess, a ball member on the trunnion and disposed in the recess in contact with said bottom surface and being of substantially the same diameter as the width of the recess and having a diametrically extending opening receiving the trunnion, each recess being of such depth that a substantial part thereof is located between the trunnion axis and the other end of the recess when the ball is initially seated against said ball engaging surface to provide a torque driving ball seat, and a member on the first member over said other end of the recess and in contact with the ball, one of said members having operative engagement with said ball outwardly of its center, to center the ball with respect to the joint axis.

GEORGE E. DUNN.